Patented Feb. 12, 1924.

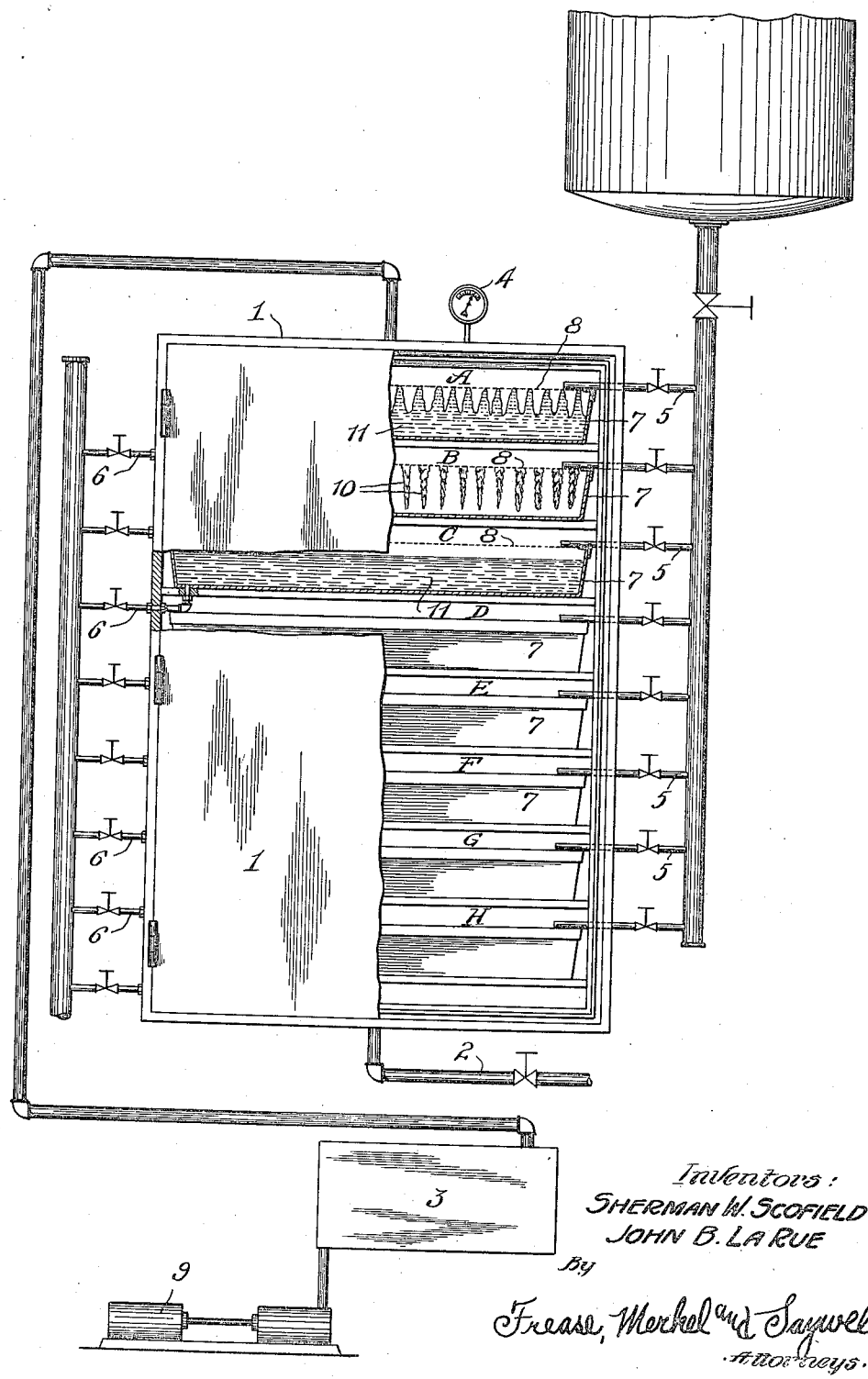

1,483,627

UNITED STATES PATENT OFFICE.

JOHN B. LA RUE AND SHERMAN W. SCOFIELD, OF CLEVELAND, OHIO; SAID LA RUE ASSIGNOR TO SAID SCOFIELD.

PROCESS OF SEPARATING THE CONSTITUENTS OF MINERAL SILICATES.

Application filed September 2, 1920. Serial No. 407,724.

*To all whom it may concern:*

Be it known that we, JOHN B. LA RUE and SHERMAN W. SCOFIELD, citizens of the United States, residents of Cleveland, county of Cuyahoga, and State of Ohio, have invented new and useful Improvements in Processes of Separating the Constituents of Mineral Silicates, of which the following is a specification, the principle of the invention being herein explained and the best mode in which we have contemplated applying that principle, so as to distinguish it from other inventions.

Our invention relates to processes for separating the constituents of mineral silicates, and particularly to processes for extracting aluminum, potassium and silicon from potash feldspar.

The claim of this application, however, is limited to the digestion of the normally insoluble silicates during the alkali-digestion step, the steps resulting in the recovery of the potassium values and the steps resulting in the separation of the aluminum and silicon being claimed in other applications.

The annexed drawing and the following description set forth in detail certain steps embodying our invention, the disclosed steps, however, constituting but one of the various methods by which the principle of the said invention may be applied.

In said annexed drawing:

The figure is a partial elevation and partial central vertical section of a vacuum chamber utilized in the carrying out of our new and improved process, this apparatus, however, being utilized in a process of producing crystalline aluminum sulphate, the said process being particularly claimed in a divisional application.

We first crush the crystalline potash-feldspar or reduce the same to small particles and then calcine the same until it is converted into a so-called amorphous state. The temperature to which it is subjected during the calcining process is substantially 1350° to 1400° centigrade. The feldspar in its natural crystalline form is only slightly soluble in solutions of caustic alkali but in the amorphous state is capable of being decomposed by a solution of caustic alkali at a high temperature and under pressure. We then mix the amorphous feldspar with caustic alkali and water and seal the same tightly in a digester. The strength of caustic alkali which we utilize is substantially ninety (90) per cent. The mixture is agitated and heated for two to three hours, the pressure rising to substantially 300 pounds per square inch and the temperature to substantially 265° to 271° centigrade. This action results in substantially complete digestion except that the insoluble silicates still remain in the digester in a crystalline form. Then the heat is continued and the moisture in the digester commences to be absorbed by the mass at the bottom of the digester, resulting in the bringing down of the pressure to substantially 100 pounds and the consequent raising of the temperature to 350° to 400° centigrade or even 500° centigrade. This results in the insoluble silicates becoming fused and the conversion of the silicic acid into silica. Then more water is added to the digester, according to the space that is afforded, causing the pressure to rise rapidly and the temperature to drop, the digestion thus reaching a point substantially 98 to 99 per cent complete. Substantially all of the constituents of the feldspar have now been converted into water soluble compounds. The heat is then shut off and the mass allowed to stand for substantially one hour. The digester then contains a concentrated solution of alkali-metal silicate and aluminate.

We then add sufficient water to the solution of alkali-metal silicate and aluminate to thin down the mass to receive carbonic acid gas in a manner hereinafter fully explained.

The resultant mother liquor contains substantially 12 to 14 per cent alkali-metal, 18 to 20 per cent aluminum, and the balance silica, when utilizing the proportions now to be mentioned.

For purposes of illustration, in the above described steps of our improved process, we wish to state that substantially four pounds potassium feldspar can be treated as above set forth, the amount of caustic alkali (for instance, potassium hydrate) utilized being substantially six pounds, and the amount of water added first to the digester being substantially four pounds, and then four pounds more after the complete fusion has taken place to complete the digestion. For thinning down the final mass to make the mother liquor suitable for receiving the carbonic acid gas, sufficient water, as required, can be utilized.

The mother liquor is placed in a standard carbonator tank and carbonic acid gas introduced, in the cold, and under slight pressure whereby silicic acid and aluminum hydroxide are precipitated and the solution contains potassium carbonate. The pressure which we utilize is additional to that normally incident to carbonating. We effect the carbonation in the cold by positively removing the heat generated by the carbonating step. This solution is decanted off, and the precipitate leached, and the leaching water added to the decanted solution. The silica and aluminum hydroxide are then comparatively dry. This step results, of course, in the recovery of the potassium from the feldspar.

The hereinafter described steps for separating the aluminum from the silicon are not specifically claimed in this application. The silica and aluminum hydroxide are then placed in a lead lined tank and treated with sulphuric acid, resulting in soluble aluminum sulphate. The solution is decanted off and the precipitate leached and the leaching water added to the decanted solution. This step results in the separation of the aluminum and silicon.

In order to extract the aluminum sulphate in crystalline form from the solution in which the same is contained, we utilize the following procedure, in connection with the apparatus shown in the accompanying drawing. This apparatus consists in a standard vacuum tank 1, connected with a steam pipe 2 running to any suitable source of supply for the steam, and a condenser 3, gauge 4, pump 9, etc. Inlets for the mother liquor 11 containing the aluminum sulphate are indicated by the ordinal 5 and outlets therefor by the ordinal 6. The chamber 1 is sub-divided into any suitable number of compartments A, B, C, etc., and within each compartment is positioned a tray 7 and adjacent the top of each compartment a screen 8. By means of the inlets 5, the mother liquor 11 containing the soluble aluminum sulphate is introduced into the trays 7 and the chamber is then subjected to a vacuum from 12 to 25 inches mercury, according to the weight of the solution, and to steam heat so as to create a temperature in the chamber 1 of from 78° to 100° Fahrenheit. This vacuum and heat results in the liquor in the trays 7 shooting up into the screens 8, as shown in compartment A in the figure, resulting in the clinging of aluminum sulphate crystals to the screens each time the solution shoots up, thus forming hanging columns 10 of these crystals, as shown in compartment B. This continues until practically all of the aluminum sulphate has been removed from the mother liquor and is in the form of crystals hanging to the screens 8. The mother liquor is then withdrawn from the chamber 1 by means of the outlets 6 and returned to the lead lined tank and mixed with the next charge therein for the use of such sulphuric acid as may have remained in the mother liquor. A substantially perfect vacuum is then created in the chamber 1, and the crystals of aluminum sulphate dried.

What we claim is:

In the process of converting potash-feldspar into potassium silicate and aluminate by means of converting crystalline feldspar into amorphous feldspar and heating a mixture of said amorphous feldspar and a solution of caustic potash in a closed vessel, the step of converting silicic acid into silica which consists in continuing the heating until the moisture is absorbed by the crystalline mass, resulting in a material reduction of the pressure and a material increase in the temperature.

Signed by us, this 13th day of August, 1920.

JOHN B. LA RUE.
SHERMAN W. SCOFIELD